United States Patent
Engel et al.

(10) Patent No.: US 11,065,817 B2
(45) Date of Patent: Jul. 20, 2021

(54) EXTRUSION ORIFICE CLEANING

(71) Applicant: MASSIVIT 3D PRINTING TECHNOLOGIES LTD., Lod (IL)

(72) Inventors: Oshri Engel, Tel Aviv (IL); Aharon Weiss, Mevo Horon (IL); Michael Levitsky, Be'er Sheva (IL); Ezra Lavi, Rishon LeTsiyon (IL)

(73) Assignee: MASSIVIT 3D PRINTING TECHNOLOGIES LTD., Lod (IL)

( * ) Notice: Subject to any disclaimer, the term of this patent is extended or adjusted under 35 U.S.C. 154(b) by 28 days.

(21) Appl. No.: 16/503,915

(22) Filed: Jul. 5, 2019

(65) Prior Publication Data
US 2020/0055249 A1    Feb. 20, 2020

Related U.S. Application Data

(60) Provisional application No. 62/718,401, filed on Aug. 14, 2018.

(51) Int. Cl.
| | |
|---|---|
| *B29C 64/35* | (2017.01) |
| *B33Y 30/00* | (2015.01) |
| *B33Y 40/00* | (2020.01) |
| *B29C 64/209* | (2017.01) |
| *B08B 1/00* | (2006.01) |
| *B08B 5/02* | (2006.01) |
| *B29C 48/27* | (2019.01) |
| *B08B 9/02* | (2006.01) |

(Continued)

(52) U.S. Cl.
CPC .............. *B29C 64/35* (2017.08); *B08B 1/005* (2013.01); *B08B 5/02* (2013.01); *B08B 9/021* (2013.01); *B08B 9/0328* (2013.01); *B22D 23/003* (2013.01); *B29C 48/272* (2019.02); *B29C 64/209* (2017.08); *B33Y 30/00* (2014.12); *B33Y 40/00* (2014.12); *B08B 2209/032* (2013.01)

(58) Field of Classification Search
CPC ..... B29C 64/118; B29C 64/209; B29C 64/35; B29C 48/272; B33Y 30/00; B33Y 40/00; B05B 15/52; B05B 15/55; B08B 1/005; B08B 5/02; B08B 9/021; B08B 9/0328; B08B 2209/032; B22D 23/003; B22F 3/115
See application file for complete search history.

(56) References Cited

U.S. PATENT DOCUMENTS 9,050,741 B2    6/2015    Keusch et al.
9,162,395 B2    10/2015   Lee et al.
(Continued)

FOREIGN PATENT DOCUMENTS

WO    WO2012167802 A1    12/2012

*Primary Examiner* — Xiao S Zhao
*Assistant Examiner* — Joseph S Leyson
(74) *Attorney, Agent, or Firm* — Katterle Nupp LLC; Paul Katterle; Robert Nupp

(57) ABSTRACT

Described is a self-cleaning extrusion orifice assembly including an enclosure, a cylindrical body inserted into the enclosure and terminated by an extrusion orifice. The self-cleaning extrusion orifice assembly is operated by a pressurized air flow. The pressurized air flow flushes surfaces of some elements of self-cleaning extrusion orifice assembly removing debris that could be deposited on these surfaces. In addition, some elements of self-cleaning extrusion orifice assembly are configured to scrape extrusion process debris from the same surfaces.

18 Claims, 13 Drawing Sheets

(51) Int. Cl.
  *B08B 9/032* (2006.01)
  *B22D 23/00* (2006.01)

(56) References Cited

U.S. PATENT DOCUMENTS

| | | |
|---|---|---|
| 9,399,346 B2 | 7/2016 | Ohnishi |
| 9,757,966 B2 | 9/2017 | Pierce et al. |
| 2008/0042331 A1 | 2/2008 | Pletner et al. |
| 2008/0099940 A1 | 5/2008 | Pettitt, Jr. |
| 2012/0126466 A1* | 5/2012 | Tajiri .................. B29C 48/272 264/555 |
| 2015/0290881 A1 | 10/2015 | Ederer et al. |

\* cited by examiner

CROSS SECTION D-D

VIEW B

CROSS SECTION E-E

VIEW F

CROSS SECTION

EXTRUSION ORIFICE CLEANING

CROSS-REFERENCE TO RELATED APPLICATION

This patent application claims the benefit of priority under 35 U.S.C. § 119(e) to Provisional Patent Application No. 62/718,401 filed on Aug. 14, 2018, which is incorporated herein by reference.

TECHNICAL FIELD

The present method and apparatus relate to the field of extrusion orifices cleaning and in particular to cleaning of orifices used in apparatuses for printing three-dimensional objects.

BACKGROUND

Extrusion is a process in which a force is applied to a solid, semisolid or fluid material to be squeezed through an orifice to obtain a shape different from the shape of the original to be squeezed material. Both circular and non-circular, symmetric and non-symmetric parts can be obtained by extrusion. In some extrusion processes the force could be assisted by temperature. Recently, the extrusion processes has found application in production or printing of three-dimensional objects. Extrusion allows production of material strips or solid core lines a few orders of magnitude thicker than the thickness of ink layers produced by inkjet printing. Stacking of such material strips or lines on top or bottom of a previously deposited strips or lines significantly accelerates production of 3D objects.

The extrusion process is usually accompanied by generation of some process debris that could be pieces of original material, dirt, dust and some particles resulting from heating, material shape transitions and others. When hardened, the process debris cold clog the orifice, attach to the three-dimensional object, although they are not supposed to form a part of the three-dimensional object, change the extruded profile shape and thus affect suitability of the extruded shape. Because of this a variety of cleaning mechanisms is used to clean the orifice and extensive post processing is applied to manufactured three-dimensional objects.

The following patents disclose different methods and apparatuses suitable for debris generated in course of the extrusion process removal: U.S. Pat. Nos. 9,050,741; 9,162,395; 9,399,346; 9,757,966; United States Patent Application Publication Nos. 2008/0042331, 2008/0099940, 2015/0290881 and Patent Cooperation Treaty Publication WO2012/167802.

SUMMARY

Described is a self-cleaning extrusion orifice assembly including an enclosure, a plunger, and a cylindrical body inserted into the enclosure and terminated by an extrusion orifice. The plunger is configured to move along the axis of symmetry of the self-cleaning extrusion orifice assembly. The plunger has a first and second movement position defined by hard stops.

The self-cleaning extrusion orifice assembly is operated by a pressurized air flow that among others moves the plunger to at least one movement position. The pressurized air flow flushes surfaces of some elements of self-cleaning extrusion orifice assembly removing debris that could be deposited on these surfaces. The dimensions of the plunger of the self-cleaning extrusion orifice assembly are selected to have a clearance or a gap with some other parts of the assembly. Additionally, the cylindrical body of the self-cleaning extrusion orifice assembly includes a number of longitudinal air conducting grooves or channels. The size of the gap allows in course of the plunger movement to scrape extrusion process debris from the surfaces on which some debris have been deposited.

Pressurized air flow force among others is a function of the ratio of the open area of the pressurized air flow inlet opening to the total area of cross sections of the gaps and longitudinal air conducting grooves or channels through which the pressurized air flows. The equation below provides pressurized air flow force sufficient to move the plunger and scrape of extrusion process debris from some of the surfaces.

$$F_f/(F_{s1}+F_{s2}) \geq 0.7-0.5,$$

Where:
$F_f$—the area of the air inlet opening 350 (FIG. 3);
$F_{s1}$—the cross-section of the pressurized air flow 324 in gap 340;
$F_{s2}$—the cross-section of pressurized air flow in gap 344.

The plunger also includes a segment with multiple-start helical grooves. The multiple-start helical grooves configured to rotate pressurized air flow such that at the exit of inner volume of the self-cleaning extrusion orifice assembly the pressurized air flow becomes a conical toroid that flushes and cleans the plunger conical segment. Therefore, the angle α of the third conical segment 618 (FIG. 6) depends on the geometric parameters of the multi-start helical groove and is determined by a function:

$$\alpha \geq \beta\left[f\left(\frac{R \cdot d_b}{2 \cdot b \cdot h \cdot n}\right)\right],$$

where
α—the angle of the third conical segment 618;
β—the angle of divergence of the pressurized air flow 644;
R—the mean radius of the helical groove;
$d_b$—the diameter of the opening 424 in enclosure 304 (FIG. 4);
b, h—the height and width of the helical groove profile;
n—the number of helical groove starts.

BRIEF DESCRIPTION OF THE DRAWINGS

The features, aspects, and advantages of the present disclosure will become better understood with regard to the following description, appended claims, and accompanying drawings where:

FIG. 8 B is a side view of an example of an enclosure of self-cleaning extrusion orifice assembly for manufacture of three-dimensional objects;

FIG. 8 C is a cross section of an enclosure of self-cleaning extrusion orifice assembly for manufacture of three-dimensional objects;

FIG. 8 D is a view of a bottom of an enclosure of FIG. 8A of self-cleaning extrusion orifice assembly for manufacture of three-dimensional objects;

DETAILED DESCRIPTION OF ILLUSTRATIVE EMBODIMENTS

The definitions set forth below are provided for purposes of illustration, not limitation, to assist with understanding the discussion that follows.

Extrusion Orifice or Nozzle—the term extrusion orifice or nozzle means an opening that terminates a hollow tube through which the extradite material is pushed by pressure. The shape of the extrusion orifice gives the extruded material, usually resin, the particular shape.

Extrusion orifice assembly—is an assembly of parts and elements supporting proper material extrusion process through the extrusion orifice or nozzle.

Self-cleaning extrusion orifice assembly—is an assembly of parts and elements automatically activating extrusion orifice cleaning process.

Cylindrical body—as used in the current disclosure the term cylindrical body presents a cylinder with a hollow channel extending the length of cylindrical body and terminated by an orifice. Material to be extruded is supplied to the orifice through the hollow channel.

Enclosure—as used in the current disclosure the term enclosure means a space surrounded by walls that encircle all of self-cleaning orifice assembly components.

Plunger—as used in the current disclosure the term plunger presents a movable part that includes a number of pressurized air conducting channels and a helical groove directing the air flow.

Clamp—as used in the current disclosure the term clamp means a part that supports fixation of the self-cleaning extrusion orifice assembly on a material supply canister or cylinder.

Extrusion is a process where raw material such as metal or plastic are pushed by a force through an orifice. The extrusion process is accompanied by formation of some process debris. Some of the debris should be removed in course of the extrusion process and some upon completion of the extrusion process. A variety of cleaning mechanisms is used to clean the orifice from debris and extensive post processing to remove the debris is applied to already manufactured three-dimensional objects. However, in all of the known orifice or even extrusion tool cleaning processes, the extrusion process must be discontinued for performing the cleaning. Discontinuing the extrusion process reduces three-dimensional objects manufacturing apparatus throughput, requires among others, presence of a qualified personnel, and/or some additional set-up time to restore the extrusion process.

The current method and apparatus disclose technical details of a method for automatic cleaning of the extrusion orifice without interrupting or minimally interrupting the continuous material extrusion process; the apparatus operation and production process. The method supports removal of debris from the extrusion orifice and debris that could affect the quality of the manufactured three-dimensional object.

Figure 1:
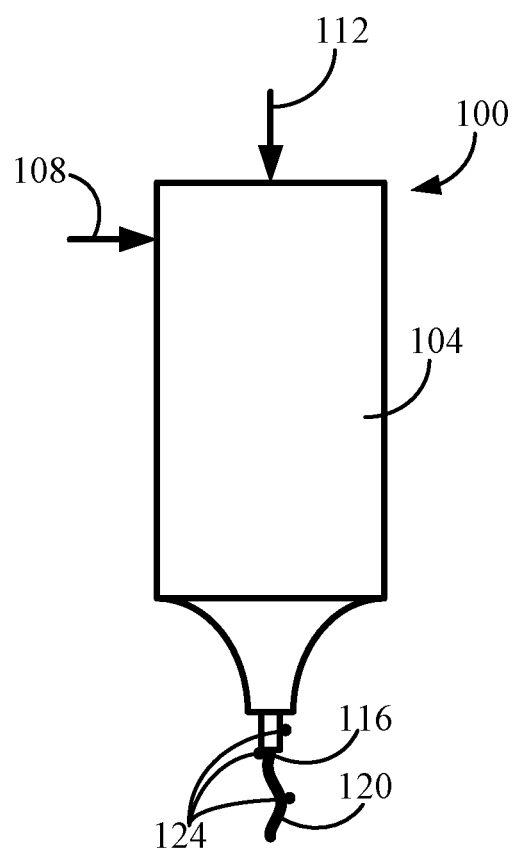
FIG. 1 is an example of an existing apparatus for manufacture of three-dimensional objects.

FIG. 1 is an example of existing apparatus for manufacture of three-dimensional objects. Apparatus 100 includes a container 104 into which a solid, semisolid or fluid material shown by arrow 108 is loaded. Pressure 112 is applied to material 108 in container 104 and the material is squeezed through orifice 116 as a continuous strips or line 120, although extrusion of segments of the material of different length is possible. Debris 124 and other particles could attach to orifice 116 and/or to the extruded from the extrusion orifice strip or line 120. When hardened, the extrusion process debris cold clog the orifice, attach to the three-dimensional object, although they are not supposed to form a part of the three-dimensional object, change the extruded profile shape and thus affect suitability of the extruded shape.

Figure 2:
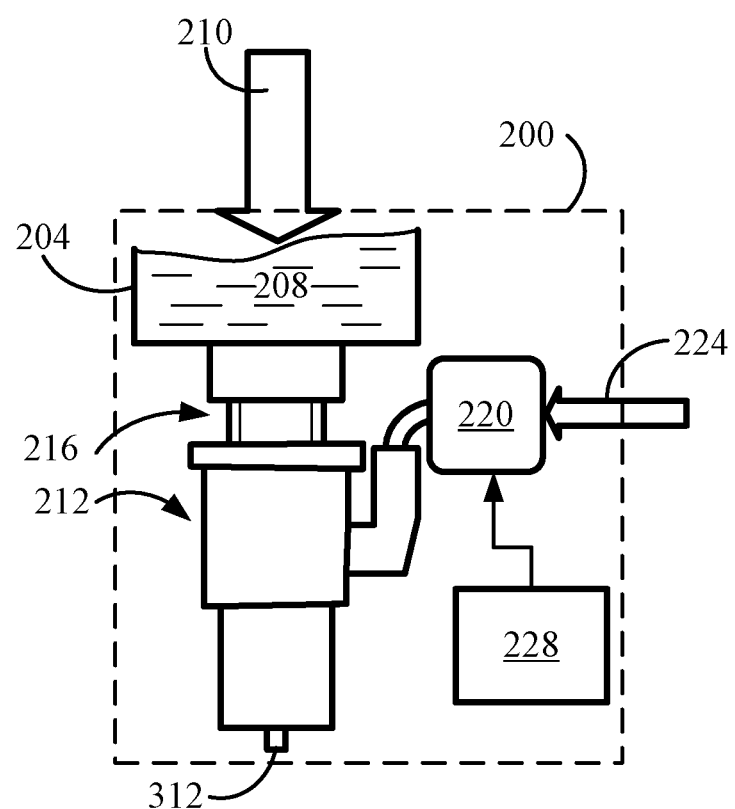
FIG. 2 is a block schema of an example of an apparatus for manufacture of three-dimensional objects.

FIG. 2 is a block schema of an example of an apparatus for manufacture of three-dimensional objects. Apparatus 200 includes a material storage container 204 into which a solid, semisolid or fluid material 208 is loaded and a self-cleaning extrusion orifice or nozzle assembly 212 is connected. Pressure, schematically shown by arrow 210 is applied to material 208 in material storage container 204. Pressure 210 applied to material 208 extrudes material 208 through extrusion orifice or nozzle 312 (FIG. 3). Self-cleaning extrusion orifice (nozzle) assembly 212 is connected to material storage container 204 with the help of a thread 216 or by any other known method that supports a sealed connection. A computer-controlled valve 220 receives from a compressor (not shown) a pressurized air flow 224. The pressure of air flow 224 could be 0.1 to 8.0 Bar. Computer 228 controls valve 220. Computer 228 opens and closes valve 220 at preset intervals or on demand. When valve 220 is open air pressure activates self-cleaning extrusion orifice assembly 212.

Figure 3A:
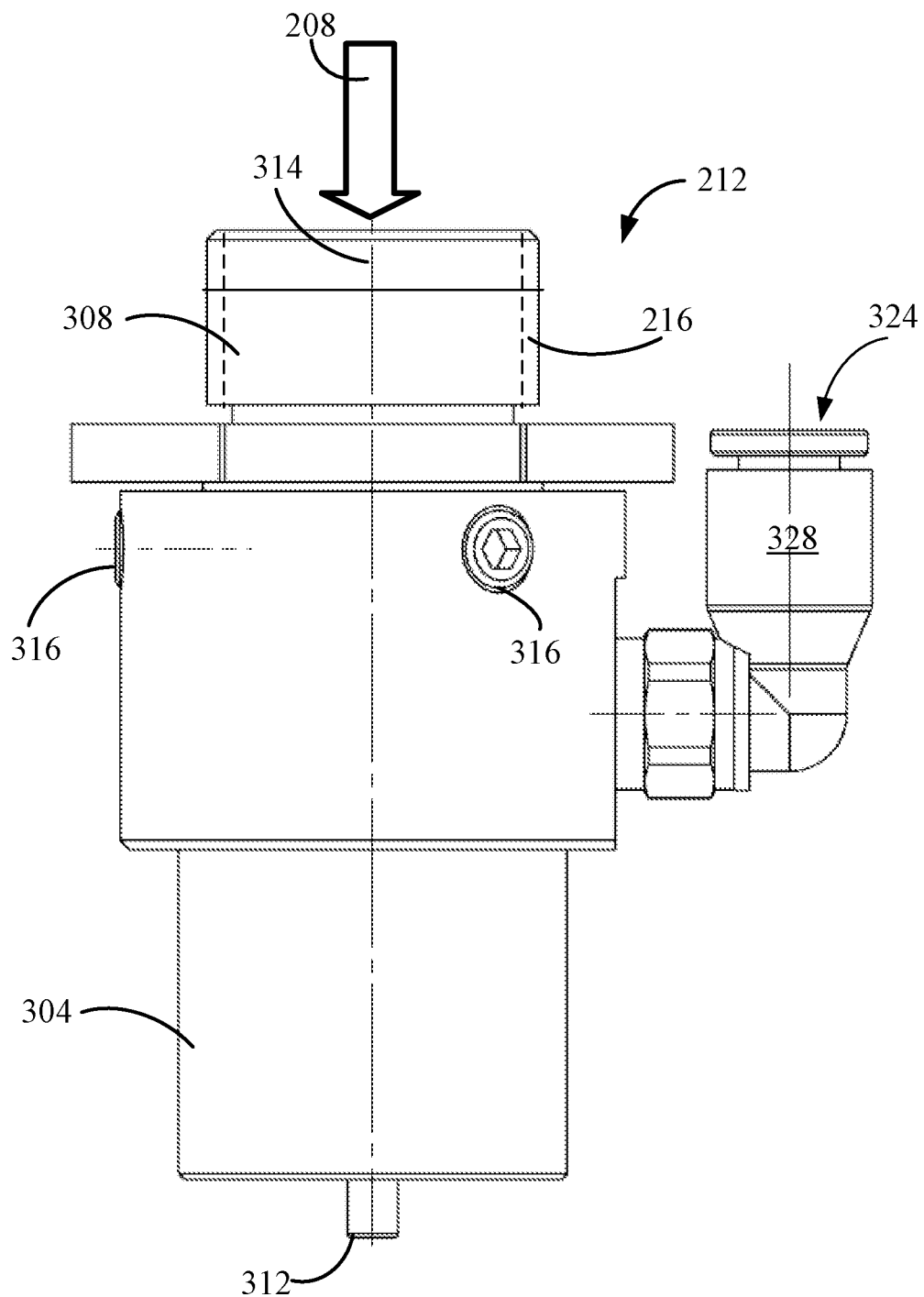
FIG. 3A is an example of a plan view of a self-cleaning extrusion orifice assembly for manufacture of three-dimensional objects.
Figure 3B:
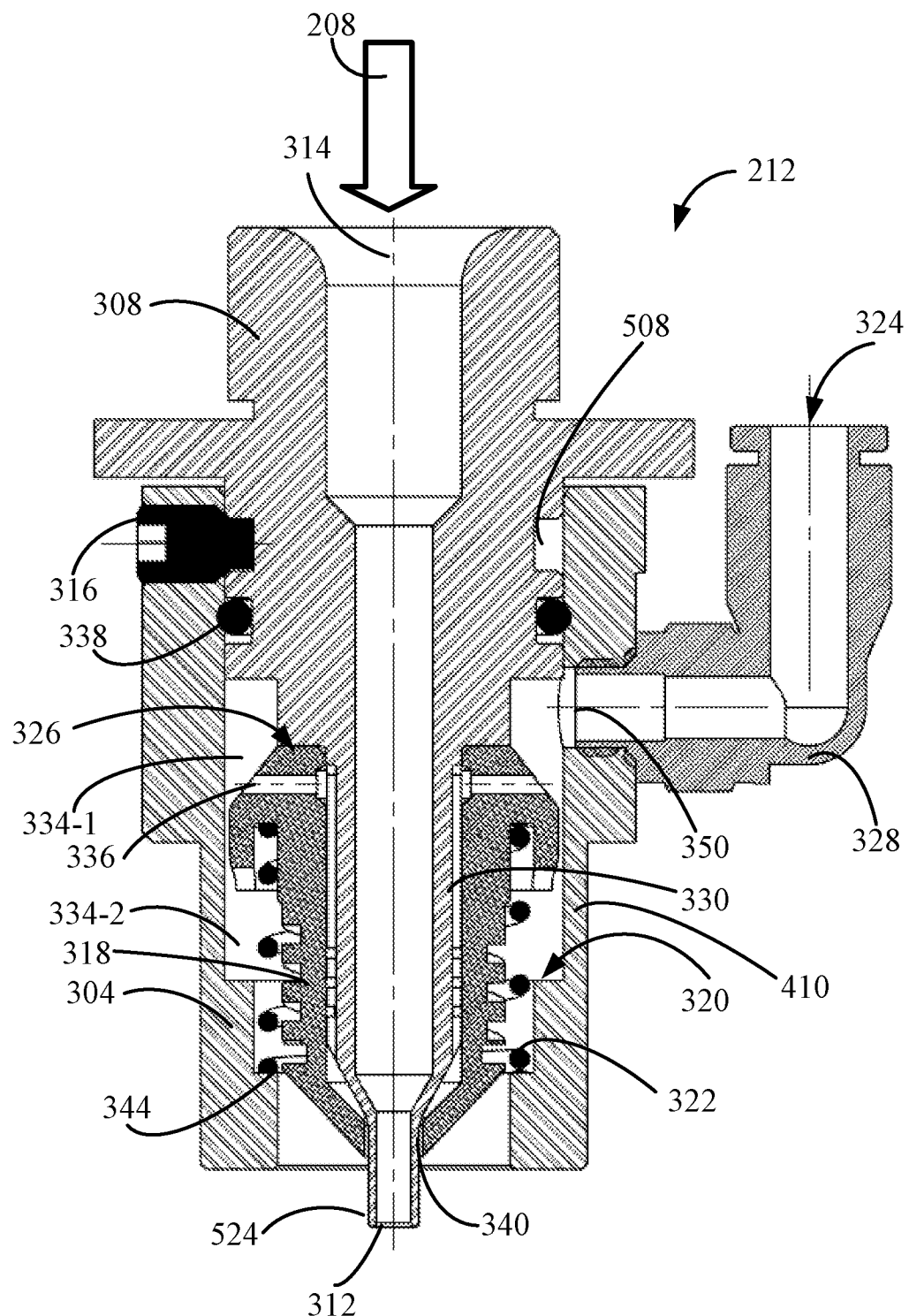
FIG. 3B is an example of first position of a plunger of a self-cleaning extrusion orifice assembly for manufacture of three-dimensional objects.
Figure 3C:
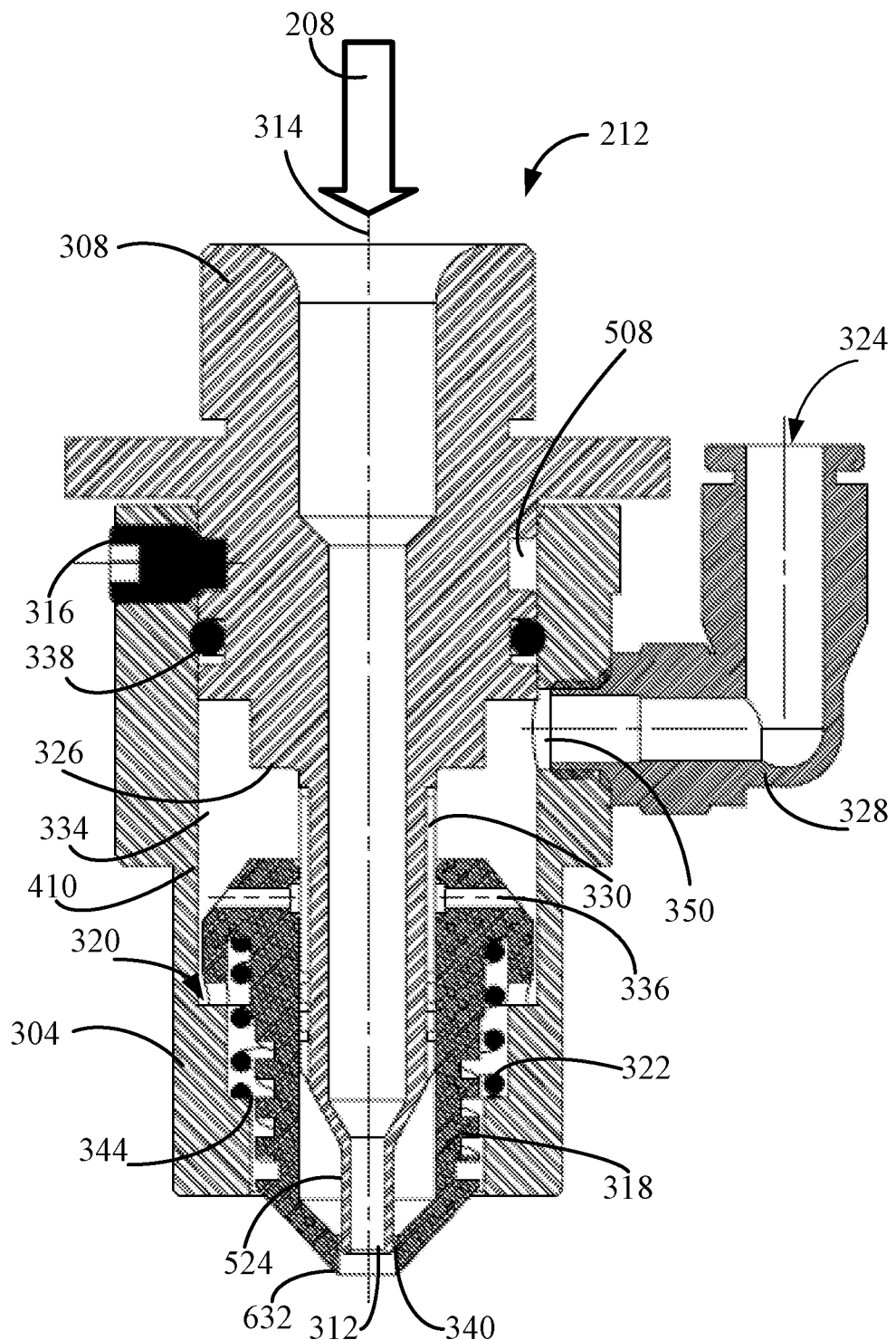
FIG. 3C is an example of a second position of a plunger of a self-cleaning extrusion orifice assembly for manufacture of three-dimensional objects.

FIGS. 3A-3C, collectively referred to as FIG. 3 are examples of a plan view and cross sections of self-cleaning extrusion orifice assembly for manufacture of three-dimensional objects. Self-cleaning extrusion orifice assembly 212 includes an enclosure 304 into which a cylindrical body 308 terminated by an orifice or nozzle 312, and a plunger 318 are inserted (FIGS. 3B and 3C). Plunger 318 is configured to move axially along a common axis of symmetry 314 of self-cleaning extrusion orifice assembly 212. Plunger 318 moves between a first hard stop 326 and second hard stop 320. Normally, spring 322 forces plunger 318 against a first hard stop 326 or into a first position (FIG. 3B). Hard stop 326 is a segment of cylindrical body 308 with different diameter of cylindrical body 308. Pressurized air flow shown by arrow 324 entering through fitting 328 and air inlet opening 350 into cavity or inner volume 334 of enclosure 304, pushes plunger 318 to a second position (FIG. 3C) defined by a hard stop 320. Cylindrical surface 330 of cylindrical body 308 serves as a guide along which plunger 318 moves. When pressurized air flow 324 is discontinued, spring 322 returns plunger 318 into the first position defined by first hard stop 326. Movement of plunger 318 (FIGS. 3B and 3C) combined with pressurized air flow 324 removes debris that could be accumulated on cylindrical surface 524 of cylindrical body 308.

All elements and/or parts of self-cleaning extrusion orifice assembly 212 are arranged along a common axis of symmetry 314 and are coaxial with each other. Pressure 210 (FIG. 2) applied to material 208 extrudes material 208 through orifice 312. Fixing and positioning screws 316 (FIG. 3) engage corresponding groove 508 (FIG. 5) of cylindrical body 308 and fix the position of enclosure 304. A sealing ring 338, such as for example an O-ring, is installed in groove 512 (FIG. 5). Sealing ring 338 prevents air leakage and supports movement of plunger 318 of self-cleaning extrusion orifice assembly 212 by air pressure. Other known in the art sealing methods and elements could also be used.

Figure 4:
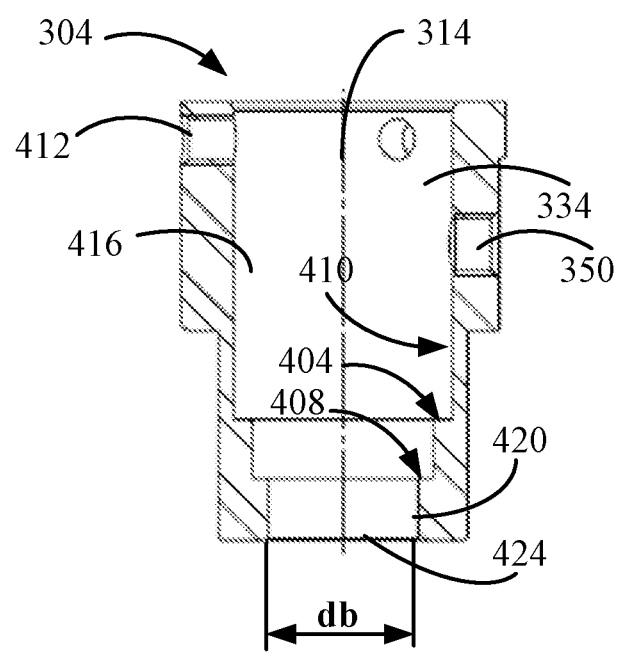
FIG. 4 is an example of an enclosure of self-cleaning tip for manufacture of three-dimensional objects.

FIG. 4 is an example of an enclosure of self-cleaning extrusion orifice assembly 212 for manufacture of three-dimensional objects. Enclosure 304 includes a plurality of different diameter segments 404-408 arranged along a common axis 314 of self-cleaning extrusion orifice assembly 212 which is also the axis of symmetry of enclosure 304. Plurality of different diameter segments 404-408 are arranged on inner surface 410 of enclosure 304. Each neighbor segment of a plurality of different diameter segments 404-408 has a different diameter and each diameter fulfils a defined task. For example, the step formed by diameter 404 serves as a second hard stop 320 for plunger 318 when plunger 318 moves into the second position. Diameter 408 of second step 408 is selected to provide a gap that facilitates pressurized air flow exit opening and support for the spring 322.

Enclosure 304 includes a number of threaded holes 412 that receive fixing and positioning screws 316 to locate and fix the position of enclosure 304. Fitting 328 connected to a source of pressurized air, supports delivery into enclosure 304 of pressurized air flow 324 (FIG. 3). Cross section or area of opening of air inlet opening 350 defines the pressure and volume of pressurized air flow and the air pressure delivered into cavity or inner volume 334 of enclosure 304. Generally, the area of air inlet opening 350 is close or even equal to the area of opening 424 defined by diameter $d_b$.

Figure 5A:
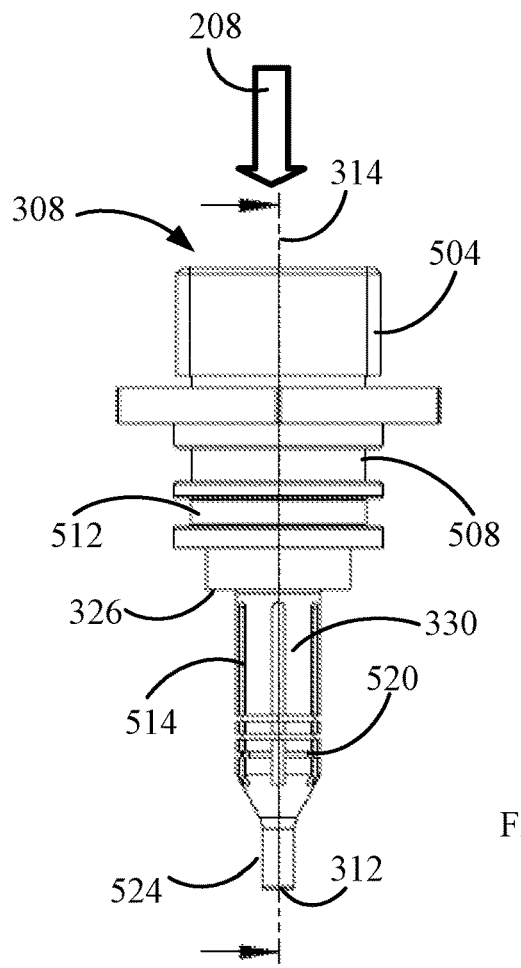
FIG. 5A is an example of a cylindrical body of self-cleaning extrusion orifice assembly for manufacture of three-dimensional objects.
Figure 5B:
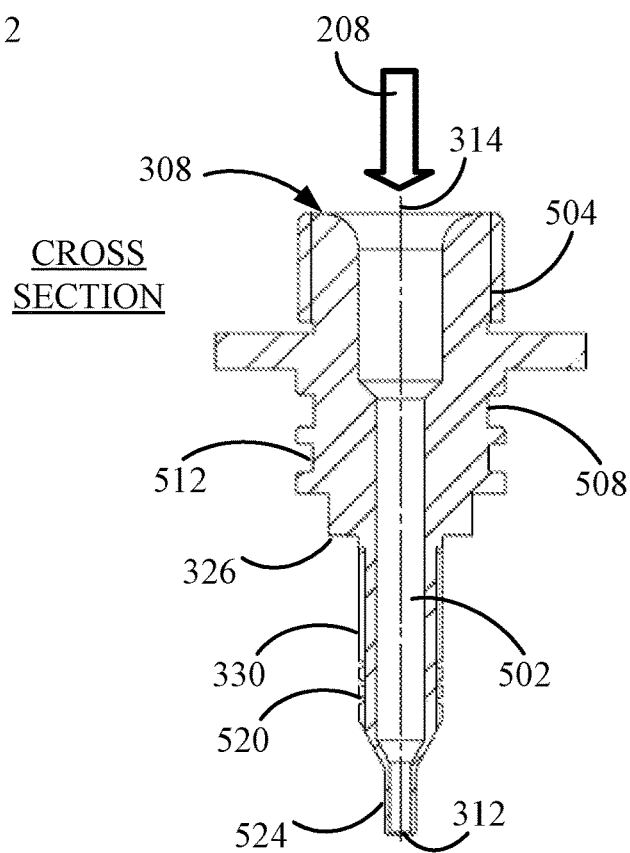
FIG. 5B is a cross section of the cylindrical body of FIG. 5A.

FIG. 5A is an example of a cylindrical body of self-cleaning extrusion orifice or nozzle for manufacture of three-dimensional objects. Cylindrical body 308 is coaxial with axis 314. Cylindrical body 308 includes a hollow channel 502 (FIG. 5B) extending the length of cylindrical body 308 and terminated by orifice 312. Material 208 (FIG. 2) is extruded through hollow channel 502 and orifice 312. Cylindrical body 308 further includes a threaded segment 504 with a thread matching the thread 216 of material storage container 204 (FIG. 2) and supporting their connection/assembly; a annular groove 508 engaging fixing and locating screws 316 (FIG. 3) that locate and fix the position of enclosure 304 and a annular groove 512 receiving an O-ring type gasket 338 or other known in the art sealing element. Flat surface 326 of cylindrical body 308 serves as a hard stop limiting movement of plunger 318.

A number of longitudinal grooves or channels 514 are made on surface 330 of cylindrical body 308. Longitudinal grooves 514 support passage of pressurized air flow to extrusion orifice 312. Annular grooves 520 also made on surface 330 of cylindrical body 308 are in fluid communication with longitudinal grooves 512 and are operative to equalize the pressure in longitudinal grooves 512 and prevent plunger 318 from being pressed against the surface of the extrusion orifice and to ensure the reliability of its movement.

In order to reduce the possibility of accumulating material 208 on edges of orifice 312, the edges are rounded with a radius of R=0.1-0.4 mm or made as a flat or sharp edge.

Figure 6A:
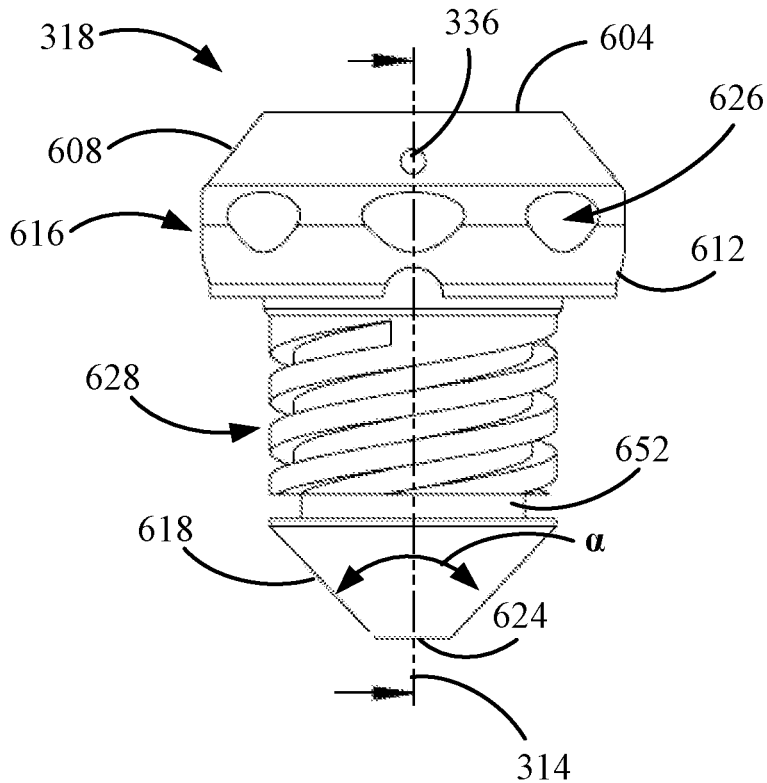
FIG. 6A is an example of a plunger of a self-cleaning extrusion orifice assembly for manufacture of three-dimensional objects.
Figure 6B:
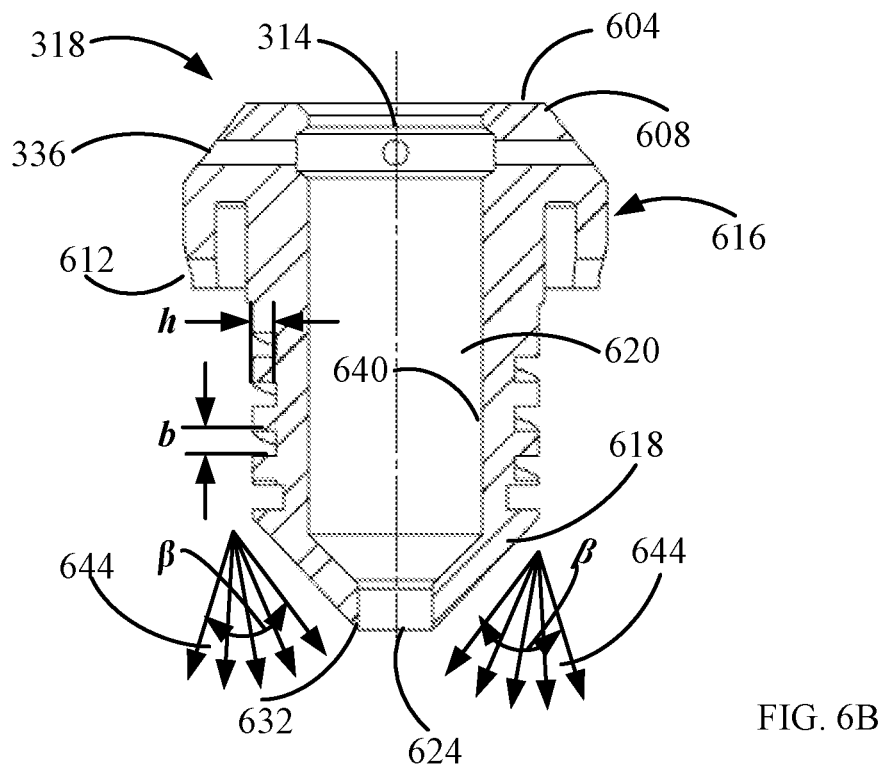
FIG. 6B is a cross section of the plunger of FIG. 6A.

FIGS. 6A and 6B (collectively referred as FIG. 6) is an example of a plunger of self-cleaning extrusion orifice assembly for manufacture of three-dimensional objects. Plunger 318 includes a flat surface 604, a first conical segment 608, a second conical segment 612 and a curved segment 616 connecting between first 608 and second 612 conical segments. Curved segment 616 provides a smooth transition surface between first conical segments 608 and second conical segment 612. Surface of curved segment 616 supports a linear circumferential contact with inner surface 410 of inner volume of enclosure 304 and facilitates smooth plunger 318 movements. The linear circumferential contact with inner surface 410 (FIG. 3A and FIG. 4) of enclosure 304 significantly reduces or almost eliminates possibility of plunger 318 jamming.

An axial channel 620 extends from flat surface 604 through the length of plunger 318 to the opposite end 624 of plunger 318. Axial channel 620 is configured to receive cylindrical body 308 (FIG. 3 and FIG. 5). There is a gap or clearance (0.05-0.1 mm) between surface 330 of cylindrical body 308 and surface 640 (FIG. 6) of plunger 318. The pressurized air flow 324 enters the gap through bores 336 flows in the gap and removes debris from cylindrical surface 524 of cylindrical body 308. To further reduce the possibility of accumulating debris of material 208 on cylindrical segment 524 (FIG. 5) of cylindrical body 308 plunger 318 could be implemented with sharp edge 632. Sharp edge 632 would scrape debris of material 208 from cylindrical surface 524 of cylindrical body 308.

A series of pressurized air flow conducting channels 336 beginning on conical surface 608 are implemented in plunger 318. Air flow conducting channels 336 conduct pressurized air flow 324 (FIG. 3) into axial channel 620 of plunger 318.

In addition to pressurized air flow supply through longitudinal grooves 514 (FIG. 5), air is supplied to inner volume or cavity 334 of enclosure 304 through vertical surfaces 626. Plunger 318 also includes a segment 628 with multiple-start helical grooves. The profile of the helical groove is defined at least by the groove width b and depth h. Pressurized air flow 324 enters cavity or inner volume 334 of enclosure 304 through air inlet opening 350 and flows through segment 628 with multiple-start helical groove. Collector 652 supports formation of a homogenous pressurized air flow. Helical grooves 628 rotate pressurized air flow such that at the exit of inner volume 334 (cavity) of enclosure 304 the pressurized air flow, schematically shown by arrows 644, becomes a conical toroid which flushes and cleans plunger 318 third conical segment 618.

Pressurized air flow 324 pressure moves or displaces plunger 318 against the spring 322 force and removes the debris from cylindrical segment 524 of cylindrical body 308. Pressurized air flow 324 (FIG. 3) could be applied continuously or intermittently to cylindrical body 308 terminated by a material extrusion orifice 312. Plunger 318 movement could also be a continuous or intermittent movement. Plunger 318 movement and pressurized air flow 324 could be synchronized. Both cylindrical body 308 terminated by a material extrusion orifice 312 and the ring of plunger 318 surrounding a material extrusion orifice 312 are coaxial structures located along a common axis of symmetry 314.

Pressurized air flow 324 pressure in inner volume or cavity 334 among others is a function of the ratio of the air inlet opening area 350 of fitting 328 to the total area of the pressurized air flow cross-section of plunger 318 helical grooves and longitudinal grooves 512 of cylindrical body 308. Inner volume or cavity 334 is divided into two sub-volumes 334-1 and 334-2. In course of the plunger 318 movement, the relation between sub-volumes 334-1 and 334-2 changes, but the sum of the sub-volumes 334-1 and 334-2 remains constant. The equation below provides pressurized air flow developed force sufficient for the plunger movement and scrape of extrusion process debris from cylindrical surface 524 and surface of third conical segment 618:

$$F_f/(F_{s1}+F_{s2}) \geq 0.7-0.5,$$

Where:
$F_f$—the area of the air inlet opening 350 (FIG. 3);
$F_{s1}$—the cross-section of the pressurized air flow 324 in gap 340;
$F_{s2}$—the cross-section of the pressurized air flow in gap 344.

In course of plunger 318 movement, sharp edge 632 removes material 208 that could accumulate on cylindrical segment 524 (FIG. 5) of cylindrical body 308. Pressurized air flow 324 flows through segment 628 with multiple-start helical grooves of plunger 318 forming a gap (0.05-0.1 mm) with surface 420 of enclosure 304. The angle of divergence (β) of pressurized air flow 644 is selected to enhance interaction with the surface of the third conical segment 618 of plunger 318. Therefore, the angle α of the third conical segment 618 (FIG. 6) depends on the geometric parameters of the multi-start helical groove and is determined by a function:

$$\alpha \geq \beta \left[ f\left( \frac{R \cdot d_b}{2 \cdot b \cdot h \cdot n} \right) \right],$$

where
α—the angle of third conical segment 618;
β—the angle of divergence of the pressurized air flow 644;
R—the mean radius of the helical groove;
$d_b$—the diameter of the opening 424 in enclosure 304 (FIG. 4);
b, h—the height and width of the helical groove profile;
n—the number of helical groove starts.

Figure 7A:
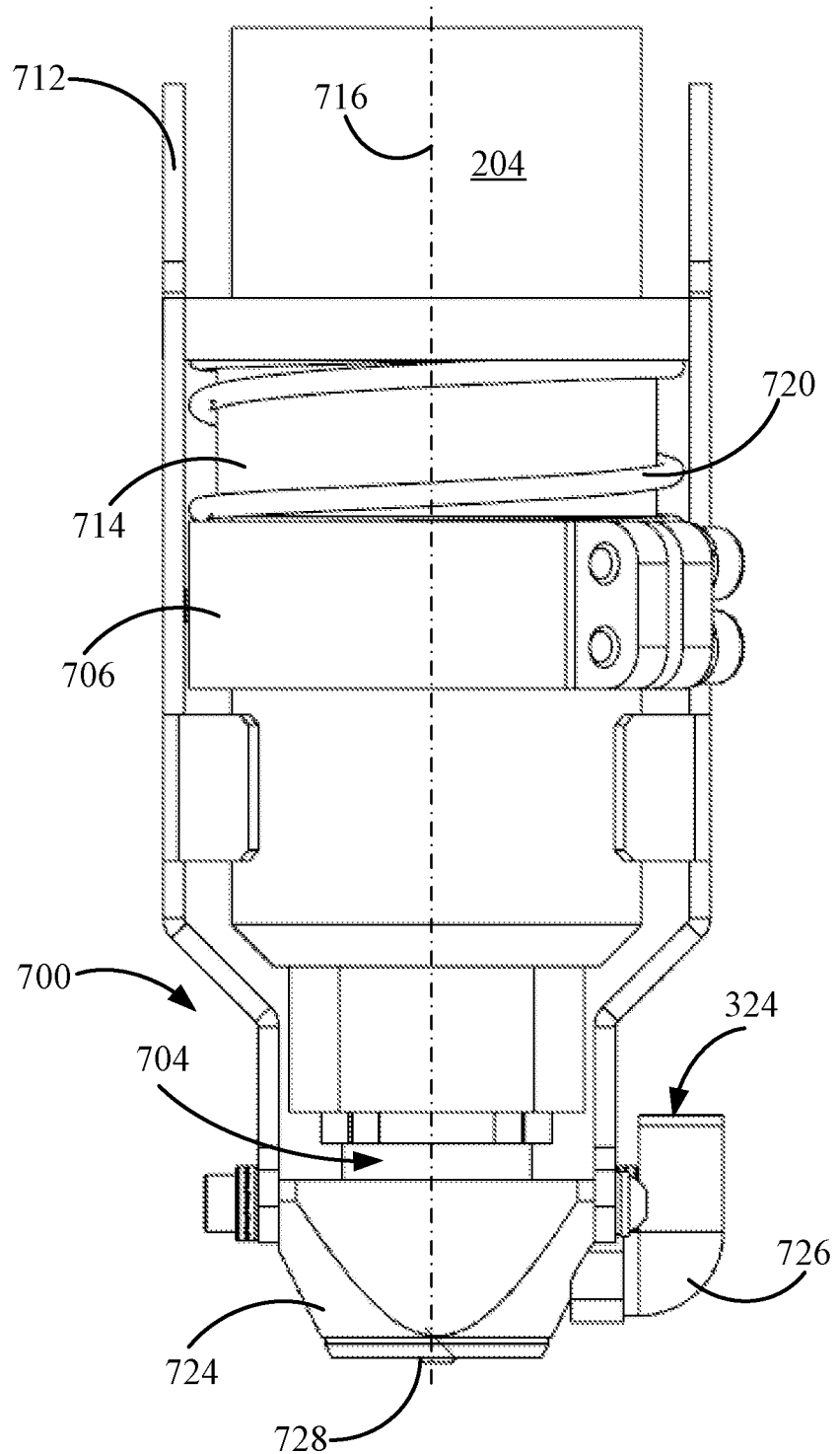
FIG. 7A is another example of a self-cleaning extrusion orifice assembly for manufacture of three-dimensional objects.

FIG. 7A is another example of an extrusion head 700 with self-cleaning extrusion orifice assembly. The extrusion head 700 assembly is shown as attached to material storage container 204. Self-cleaning orifice assembly 704 includes an enclosure 724 given in greater detail in FIG. 8 and a cylindrical body 904 given in greater detail in FIG. 9. Clamp 706 holds cylindrical body of extrusion orifice 704 on material storage container 204 and serves as a fixed support for the spring 720. Two drawbars 712 hold enclosure 724 in a manner that supports linear movement of enclosure 724 relative to extrusion orifice assembly 704 along a common axis 716. Supply of pressurized air flow 324 to enclosure 724 forces axial movement of enclosure 724, drawbars 712 and slide ring 714 against cylindrical body of extrusion orifice 704.

Figure 7B:
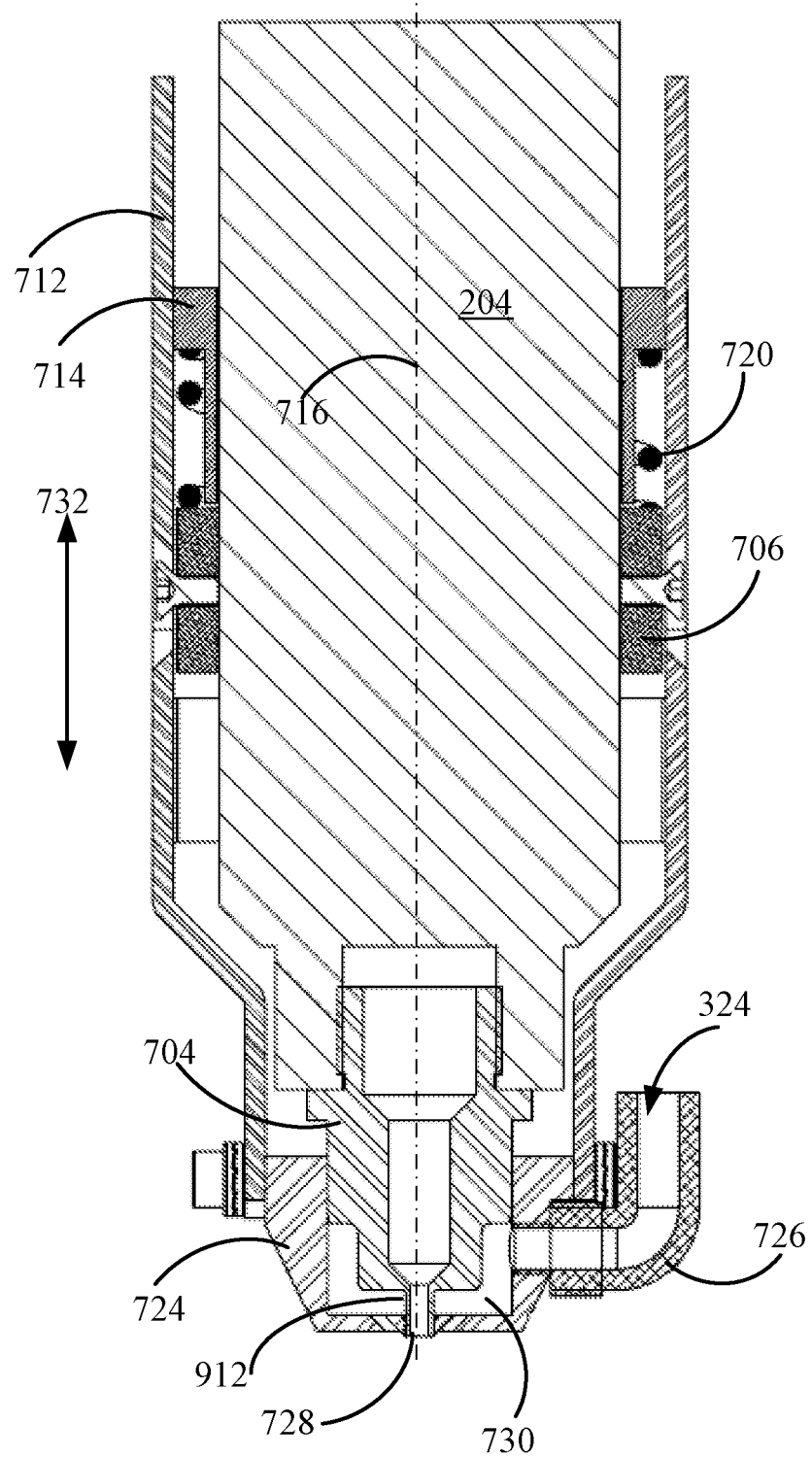
FIG. 7B is a cross section of a self-cleaning extrusion orifice assembly of FIG. 7A.
Figure 8A:
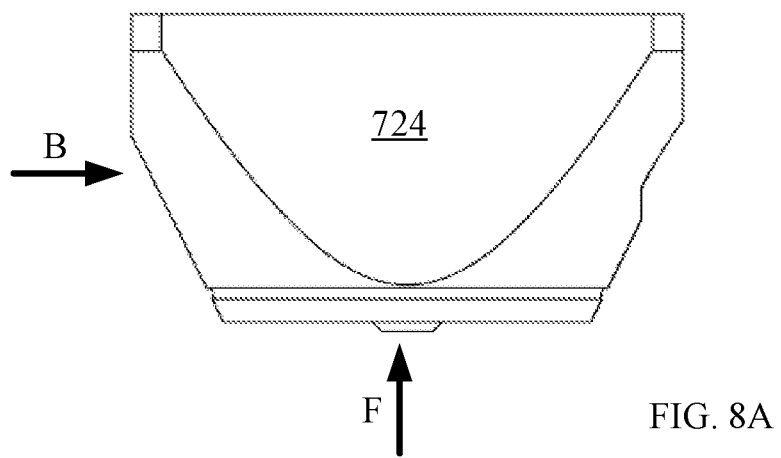
FIG. 8 A is a plan view of an example of an enclosure of a self-cleaning extrusion orifice assembly for manufacture of three-dimensional objects.
Figure 8B:
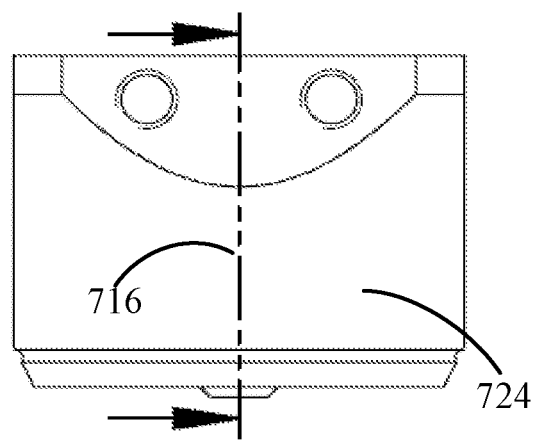
Figure 8C:
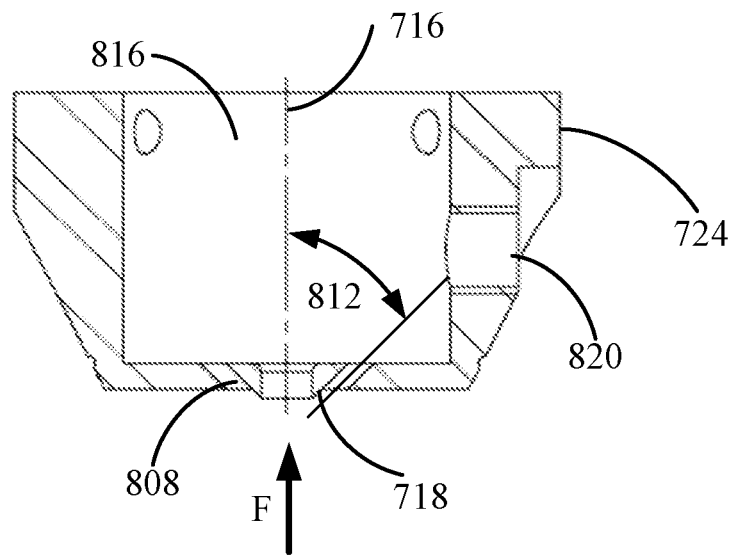
Figure 8D:
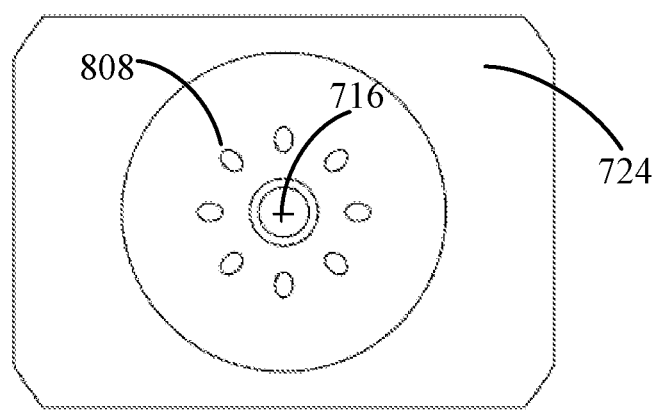

Pressurized air flow shown by arrow 324 enters into enclosure 724 through fitting 726 and flows along cylindrical body 704 (FIG. 7B) of extrusion orifice 704. Pressurized air flow shown by arrow 324 enters chamber 730 of enclosure 724 and develops pressure sufficient to forces axial movement, shown by arrow 732, of enclosure 724, drawbars 712 and slide ring 714 against cylindrical body of extrusion orifice 704.

When pressurized air flow 324 is discontinued, spring 720 (FIG. 7) forces axial movement of enclosure 724, drawbars 712 and slide ring 714 against cylindrical body of extrusion orifice 728 and of cylindrical body 704 into a second position. Cylindrical surface of material storage container 204 (FIG. 2) serves as a guide along which enclosure 724 moves.

Concurrently, pressurized air flow 324 is exiting through a plurality of small diameter (0.2 to 1.0 mm) holes 808 (FIGS. 8C and 8D) made in enclosure 724 and oriented at an angle 812 of 40 to 50 degrees and mostly at an angle of 45 degrees to a common axis 716. The plurality of small diameter holes 808 are arranged in a circular arrangement around common axis 716 of solid body of extrusion orifice 704. Pressurized air flow exiting holes 808 flows along cylindrical segment 912 (FIG. 9) of cylindrical body of extrusion orifice 904 removing the debris that could be accumulated on cylindrical segment 912. Sharp edges 718 of enclosure 724 scrape residual material that was not removed by the pressurized air flow exiting holes 808.

Figure 9A:
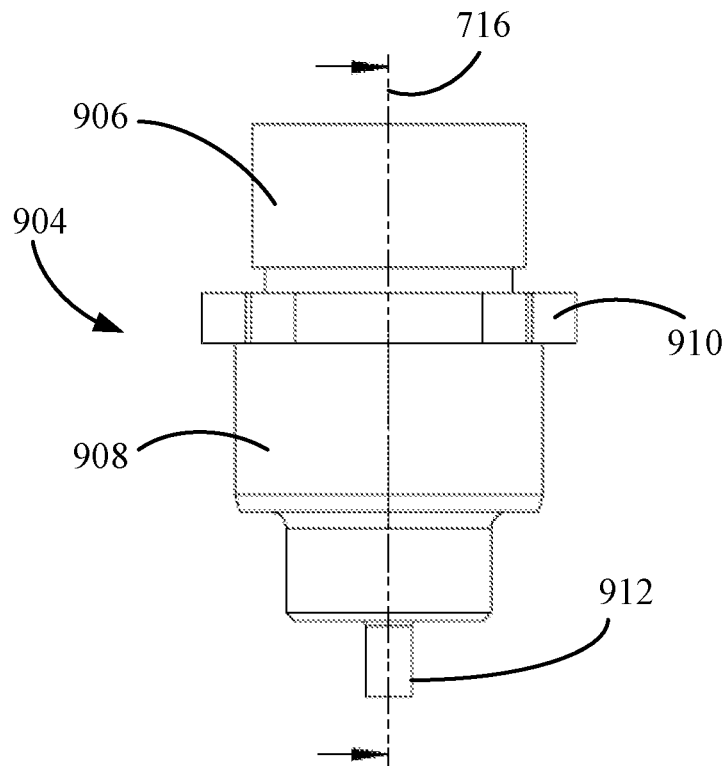
FIG. 9A is an example of a cylindrical body of self-cleaning extrusion orifice assembly for manufacture of three-dimensional objects.
Figure 9B:
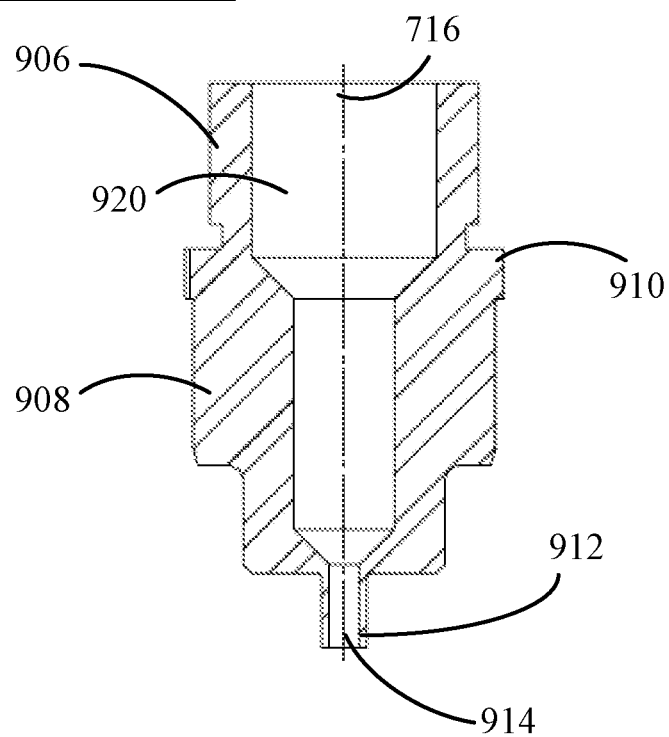
FIG. 9B is a cross section of a cylindrical body of FIG. 9A.

FIGS. 9A and 9B collectively referred as FIG. 9 are an example of a cylindrical body of self-cleaning extrusion orifice or nozzle for manufacture of three-dimensional objects. Cylindrical body 904 is a symmetrical body coaxial with axis 716. Cylindrical body 904 includes a segment 906 with a thread matching thread 216 of material storage container 204 (FIG. 2), a cylindrical segment 908, a faceted segment 910 and a segment 912 terminated by an extrusion orifice 914 similar to extrusion orifice 312. Extrusion orifice 914 also includes a hollow channel 920 that extends the length of cylindrical body 904. Material 208 is extruded through orifice 914. Threaded segment 906 with a thread matching thread 216 (FIG. 2) of material storage container 204 supports connection of cylindrical body 904 to material storage container 204.

In order to reduce the possibility of accumulating debris of material 208 on edges of orifice 914, the edges are rounded with a radius of R=0.1-0.4 mm or made as a flat or sharp edge. Movement of enclosure 724 combined with pressurized air flow through holes 808 removes debris that could be accumulated on cylindrical surface 912 of cylindrical body 904.

The disclosed cleaning method and apparatus remove the need to clean the orifice from debris and extensive post processing related to removal of the debris from already manufactured three-dimensional objects. The method and apparatus support a continuous extrusion process; increase in a three-dimensional objects manufacturing apparatus throughput and do not require presence of a qualified personnel.

It will also be appreciated by persons skilled in the art that the present disclosure is not limited to what has been particularly shown and described hereinabove. Rather, the scope of the method and apparatus includes both combinations and sub-combinations of various features described hereinabove as well as modifications and variations thereof which would occur to a person skilled in the art upon reading the foregoing description and which are not in the prior art.

What is claimed is:

1. A self-cleaning extrusion orifice assembly, comprising:
an enclosure;
a cylindrical body inserted into the enclosure and terminated by a cylindrical segment defining an orifice;
a plunger and a spring, the plunger configured to move along an axis of symmetry of the self-cleaning extrusion orifice assembly and having a first position and a second position, wherein the spring presses the plunger into the first position; and
a fitting configured to accept a pressurized airflow and convey the air flow into a n inner volume of the enclosure, wherein the pressurized airflow develops a force sufficient to move the plunger into the second position and scrape off deposited extrusion process debris from surfaces of the cylindrical segment.

2. The assembly according to claim 1, wherein the enclosure includes a plurality of different diameter segments arranged along a common axis of the enclosure and the self-cleaning extrusion assembly.

3. The assembly according to claim 2, wherein the different diameter segments are arranged on an inner surface of the enclosure.

4. The assembly according to claim 2, wherein each segment of the different diameter segments has a diameter different from a neighbor segment diameter.

5. The assembly according to claim 1, wherein the cylindrical body inserted into the enclosure includes at least one annular groove configured to receive a sealing element and at least one annular groove configured to engage fixing and position screws.

6. The assembly according to claim 1, wherein the cylindrical body inserted into the enclosure includes at least one longitudinal groove that is parallel to a common axis of symmetry of the cylindrical body and the self-cleaning extrusion orifice assembly.

7. The assembly according to claim 1, wherein the cylindrical body inserted into the enclosure includes longitudinal grooves and a plurality of annular grooves that are in fluid communication with the longitudinal grooves.

8. The assembly according to claim 1, wherein the cylindrical body includes a hollow channel configured to receive material squeezed from a material storage container.

9. The assembly according to claim 1, wherein the plunger includes a first conical segment, a second conical segment and a curved segment connected between the first and the second conical segments.

10. The assembly according to claim 9, wherein the curved segment connected between the first and the second conical segments supports a linear circumferential contact with an inner surface of the enclosure and facilitates smooth movement of the plunger.

11. The assembly according to claim 9, wherein the plunger is inserted into the enclosure and surrounds the cylindrical body, wherein the enclosure includes an inlet opening and an exit, and wherein the force is defined by the equation:

$$F_f/(F_{s1}+F_{s2}) \geq 0.7-0.5,$$

where $F_f$—area of the inlet opening;
$F_{s1}$—area of a cross-section of the air flow in a first gap;
$F_{s2}$—area of a cross-section of the air flow in a second gap;
wherein the first gap is located between the plunger and the cylindrical segment of the cylindrical body, wherein the plunger includes a third conical segment adjacent the exit and the second gap is located between the enclosure and the third conical segment.

12. The assembly according to claim 1, wherein the plunger further includes a segment with multiple-start helical grooves.

13. The assembly according to claim 1, wherein a segment of the plunger includes a multiple-start helical grooves and is configured to rotate the pressurized airflow such that at an exit of an inner volume of the enclosure, the pressurized air flow becomes a conical toroid that flushes and cleans a surface of a conical segment of the plunger adjacent the exit.

14. The assembly according to claim 13, wherein an angle of the conical segment depends on geometric parameters of the multi-start helical grooves and is determined by a function:

$$\alpha \geq \beta[f(Rd_b/2bhn)], \text{ where}$$

α—the angle of the conical segment;
β—angle of divergence of the pressurized air flow between the conical segment and the exit;
R—mean radius of the multiple-start helical grooves;
$d_b$—diameter of an opening in the enclosure defining the exit;
b, h—height and width of a profile of the multiple-start helical grooves;
n—the number of starts of the multiple-start helical grooves.

15. The assembly according to claim 1, wherein the plunger further includes a channel extending a length of the plunger.

16. A self-cleaning extrusion orifice assembly, comprising:
a cylindrical body terminated by a cylindrical segment defining an orifice;
a plunger with first, second and third conical segments; and
a segment with multiple-start helical grooves, wherein the plunger moves to scrape off deposited extrusion process debris from the cylindrical segment.

17. The assembly according to claim 16, further comprising an enclosure with an inner cavity, wherein the plunger is inserted into the enclosure and surrounds the cylindrical body, wherein the enclosure includes an inlet opening and an exit, wherein the third conical segment is adjacent the exit and wherein a pressurized air flow develops a force sufficient to move the plunger and scrape off extrusion process debris from some surfaces of the cylindrical segment on which debris has been deposited, wherein the force is defined by the equation:

$$F_f/(F_{s1}+F_{s2}) \geq 0.7-0.5,$$

where $F_f$—area of the inlet opening;
$F_{s1}$—area of a cross-section of the air flow in a first gap;
$F_{s2}$—area of a cross-section of the air flow in a second gap;
wherein the first gap is located between the plunger and the cylindrical segment of the cylindrical body, and wherein the second gap is located between the enclosure and the third conical segment.

18. The assembly according to claim 17, wherein pressure of the pressurized air flow in the inner cavity is a function of a ratio of an area of the air inlet opening to a total cross-sectional area of the helical grooves of the plunger and longitudinal grooves of the cylindrical body through which the pressurized air flow travels.

\* \* \* \* \*